United States Patent
Landesmann et al.

(10) Patent No.: US 7,636,756 B2
(45) Date of Patent: *Dec. 22, 2009

(54) SYSTEM AND METHOD FOR GRANTING DEPOSIT-CONTINGENT E-MAILING RIGHTS

(75) Inventors: Mark Landesmann, Palo Alto, CA (US); Randy Korba, Menlo Park, CA (US)

(73) Assignee: Buyerleverage E-Mail Solutions LLC, Palo Alto, CA (US)

( * ) Notice: Subject to any disclaimer, the term of this patent is extended or adjusted under 35 U.S.C. 154(b) by 105 days.

This patent is subject to a terminal disclaimer.

(21) Appl. No.: 11/932,581

(22) Filed: Oct. 31, 2007

(65) Prior Publication Data
US 2008/0071876 A1 Mar. 20, 2008

Related U.S. Application Data

(63) Continuation of application No. 11/192,416, filed on Jul. 29, 2005, now Pat. No. 7,379,972, which is a continuation-in-part of application No. 09/984,884, filed on Oct. 31, 2001, now Pat. No. 7,072,943, said application No. 11/192,416.

(60) Provisional application No. 60/244,609, filed on Nov. 1, 2000, provisional application No. 60/592,087, filed on Jul. 29, 2004.

(51) Int. Cl.
*G06F 15/16* (2006.01)

(52) U.S. Cl. ............ 709/206; 709/203; 709/207; 705/39; 705/40

(58) Field of Classification Search .......... 709/203, 709/205–207; 705/39–40
See application file for complete search history.

(56) References Cited

U.S. PATENT DOCUMENTS

| 4,935,956 A | 6/1990 | Hellwarth et al. |
| 5,508,817 A | 4/1996 | Kunigami |
| 5,764,899 A | 6/1998 | Eggleston et al. |
| 5,794,210 A | 8/1998 | Goldhaber et al. |
| 5,828,737 A | 10/1998 | Sawyer |

(Continued)

FOREIGN PATENT DOCUMENTS

WO WO-99/29099 6/1999

OTHER PUBLICATIONS

Dwork, C. et al., "Pricing Via Processing or Combatting Junk Mail," pp. 1-11.

(Continued)

*Primary Examiner*—Shawki S Ismail
(74) *Attorney, Agent, or Firm*—Foley & Lardner LLP

(57) ABSTRACT

An Email guarantee deposit method, system, and program product, with the method comprising in one embodiment, the steps of: receiving from a sender a request to send to a recipient an Email; receiving a deposit or an authorization to obtain a deposit of something of value; sending the Email to the recipient only if a deposit of authorization for a deposit is received; determining if the recipient has accepted the deposit; and if the recipient has accepted the deposit, then facilitating the disposal of the deposit. In an important alternate embodiment, a deposit can be required before an Email with a auditory or visual enhancement is provided, or before routing to a designated type of device occurs.

51 Claims, 6 Drawing Sheets

U.S. PATENT DOCUMENTS

| | | | |
|---|---|---|---|
| 5,855,008 | A | 12/1998 | Goldhaber et al. |
| 5,930,479 | A * | 7/1999 | Hall .................. 709/238 |
| 5,999,967 | A | 12/1999 | Sundsted |
| 6,023,723 | A | 2/2000 | McCormick et al. |
| 6,052,709 | A | 4/2000 | Paul |
| 6,072,942 | A | 6/2000 | Stockwell et al. |
| 6,101,485 | A | 8/2000 | Fortenberry et al. |
| 6,101,531 | A | 8/2000 | Eggleston et al. |
| 6,167,434 | A | 12/2000 | Pang |
| 6,192,114 | B1 * | 2/2001 | Council .................. 379/114.14 |
| 6,199,102 | B1 | 3/2001 | Cobb |
| 6,209,095 | B1 | 3/2001 | Anderson et al. |
| 6,393,464 | B1 | 5/2002 | Dieterman |
| 6,421,709 | B1 | 7/2002 | McCormick et al. |
| 6,484,197 | B1 | 11/2002 | Donohue |
| 6,587,550 | B2 | 7/2003 | Council et al. |
| 6,697,462 | B2 | 2/2004 | Raymond |
| 6,741,969 | B1 | 5/2004 | Chen et al. |
| 7,072,942 | B1 | 7/2006 | Maller |
| 7,072,943 | B2 | 7/2006 | Landesmann |
| 7,181,498 | B2 | 2/2007 | ZHU et al. |
| 2001/0023432 | A1 | 9/2001 | Council et al. |
| 2002/0052855 | A1 | 5/2002 | Landesmann |
| 2002/0165898 | A1 | 11/2002 | Duffy et al. |
| 2002/0169954 | A1 | 11/2002 | Bandini et al. |
| 2003/0009285 | A1 | 1/2003 | Picone et al. |
| 2003/0023736 | A1 | 1/2003 | Abkemeier |
| 2003/0086543 | A1 | 5/2003 | Raymond |
| 2003/0114157 | A1 | 6/2003 | Spitz et al. |
| 2004/0122730 | A1 | 6/2004 | Tucciarone et al. |
| 2004/0165707 | A1 | 8/2004 | Raymond |
| 2004/0210639 | A1 | 10/2004 | Ben-Yoseph |
| 2004/0230531 | A1 | 11/2004 | Weiss |
| 2005/0076240 | A1 | 4/2005 | Appleman |
| 2005/0076241 | A1 | 4/2005 | Appleman |
| 2005/0086365 | A1 | 4/2005 | Urro |
| 2005/0144244 | A1 | 6/2005 | Landesmann |
| 2005/0192819 | A1 | 9/2005 | Smith et al. |
| 2005/0193075 | A1 | 9/2005 | Haff et al. |
| 2005/0198174 | A1 | 9/2005 | Loder et al. |
| 2005/0198176 | A1 | 9/2005 | Landesmann |
| 2006/0026107 | A1 | 2/2006 | Urro |
| 2006/0080395 | A1 | 4/2006 | Landesmann et al. |
| 2007/0022007 | A1 | 1/2007 | Lawe |
| 2007/0083433 | A1 | 4/2007 | Lawe |
| 2007/0203997 | A1 | 8/2007 | Ingerman et al. |

OTHER PUBLICATIONS

Krishnamurthy et al., "SHRED: Spam Harassment Reduction via Economic Disincentives," AT&T Labs-Research, Eureka! Computing Solutions, Inc., pp. 1-14.

Nail et al., "The Real Answer to the Spam Problem," Whole View, Tech Strategy Research, Dec. 10, 2003, pp. 1-5.

Technical Forum, IBM Systems Journal, vol. 41, No. 4, 2002, pp. 759-766.

* cited by examiner

SYSTEM AND METHOD FOR GRANTING DEPOSIT-CONTINGENT E-MAILING RIGHTS

CROSS-REFERENCE TO RELATED APPLICATIONS

This application is a Continuation of U.S. patent application Ser. No. 11/192,416 filed Jul. 29, 2005, now U.S. Pat. No. 7,379,972 which is a Continuation-in-Part of U.S. application Ser. No. 09/984,884, filed Oct. 31, 2001, now U.S. Pat. No. 7,072,943 incorporated herein by reference in its entirety, which is an application claiming the benefit under 35 USC 119(e) of U.S. Application No. 60/244,609, filed Nov. 1, 2000, incorporated herein by reference in its entirety. Application Ser. No. 11/192,416 is an application also claiming the benefit under 35 USC 119(e) of U.S. Application 60/592,087, filed Jul. 29, 2004, incorporated herein by reference in its entirety.

FIELD OF THE INVENTION

The present invention relates generally to the field of network and Internet communications, and more particularly to the field of automatic Email control.

BACKGROUND OF THE INVENTION

Jupiter Media Metrix predicts that the average Email address will receive 40 times as many Emails as it is receiving now by the year 2005. Even at current levels, consumers show a concern about protecting their Email inboxes against unwanted Email (hereafter referred to as "spam"). At the same time consumers must constantly relinquish their Email address to third parties in the course of availing themselves of the many products and services that are offered on the Web. Individuals also find it necessary or useful to communicate with many private individuals by Email temporarily, yet do not necessarily wish to grant these individuals long-term access to their Email inbox. But reviewing and discarding commercial Emails takes time and effort and many individuals resent their inability to shield themselves against this unwanted intrusion.

Many people like or need to be immediately notified when Emails come in, and enable features in their Email application that provide them with visual or auditory signals to alert them of an incoming Email. To those individuals the unwanted interruption of unwanted Email is even more bothersome. In addition, wireless devices have limited screen space, lower memory storage and longer download times, which all work to increase the productivity costs of unwanted Email.

A key problem which results from spam is that people are reluctant to publish their Email addresses in publicly available directories. Indeed, individuals who list their Email address in a public directory are likely to receive many additional unwanted commercial Emails. Spammers can simply retrieve their Email address from these public listings and use them to send commercial Email messages. Consumers who evade these spammers by declining to list their Email address in a public directory, also make their Email address unavailable to those who do not have their Email address, but might have a legitimate interest in contacting them. Contacting people by telephone is not always possible, because many numbers are not listed or otherwise not available. Even when it is possible, contacting people by phone to ask them for their Email address is inconvenient.

None of the current technologies and methods which allow consumers to protect themselves against unwanted Email, hold the promise of combating spam effectively enough to allow consumers to publish their Email addresses publicly. Such technologies described as follows:

Opt-in and Unsubscription

Some businesses especially those that regularly send third party advertisements by Email to a group of opt-in Email subscribers allow these subscribers to opt-out by replying to an Email or clicking on a link in the Email. However many companies do not. In addition, of the companies that do

- many reserve the right to change their privacy policies, and
- some release their Email addresses to third parties in the course of conducting business, even if their privacy policy says that will not do so.

And:

- Most privacy policies allow for Email addresses to be disclosed to third parties or to be sold or exchanged with business partners.
- Even a binding promise not to sell or disclose an Email address to a third party does not survive company bankruptcy.
- Many companies have insufficient safeguards against unauthorized or accidental disclosure of their consumer's Email addresses.

Most importantly, even if a majority of companies voluntarily refrain from sending volume Emails, and take proper safeguards against unauthorized disclosure, advances in technology allow even a small group of spammers to send many hundreds of millions of unwanted Emails and to sell Email addresses to other spammers.

Legislation which would mandate that companies abide by the privacy policies that they publish may be passed in the future, but no legislation that generally prohibits sending Email to individuals who have not expressly given permission to receive such Email is expected due to first amendment concerns. Also any legislation would be difficult to enforce on the Internet due to its global reach and the ability to send Email messages from virtually anywhere outside the United States.

Hotmail and other Email providers allow consumers to "block senders" i.e. to block Emails coming from a particular Email address/outbox. However, senders can change their outgoing Email address at will so that this mechanism is not effective.

Some providers also refer Emails that are sent to multiple recipients on the same network to a separate Bulk Email folder. The problems with this mechanism are

- Some Emails that are sent to multiple recipients are either private Emails that are sent by individuals to multiple recipients, or wanted newsletters or bulk Emails sent by businesses. Therefore, the Email recipient must still periodically review this folder as well for wanted Emails.
- Technology exists currently, and is likely to be further developed, that allows senders to send Emails to many recipients in an reiterative process which simulates individual mailings. While there may be other technologies to counteract this, it is likely that the technologies of spammers and those that seek to confound them will continue to leapfrog each other. Few, if any, analysts predict that the outcome of this technological race will be spam-free Email inboxes.

Yet another method of protecting consumers against unwanted Email is the blacklisting of senders and their IP addresses. Programs exist that block Emails from blacklisted senders. Internet service providers such as Abovenet and UUnet exercise pressure on their business consumers to adopt strict opt-in Email policies. But as noted above, spammers can switch internet service providers and/or Email addresses to evade detection and blocking of their Emails.

Yet another method of protecting consumers against unwanted Email is for the content of the Emails to be screened by artificial intelligence based software programs. Depending on the content and which words or phrases are found in the Email, Emails are then either blocked or routed to less important folders which the user is presumed to check less frequently. The problems with this method are Spammers can easily avoid the use of phrases and words that are likely to trigger a bloc or a filtering criterion against spam. Conversely, if the Email rules and filters that apply to the content are too restrictive, some desired Email which the recipient would have liked to receive will get blocked or filtered out. This is the reason that some of the filtering programs allow the user to review the Email that has been filtered or blocked—however, if the user needs to perform a review, this defeats the very purpose of the filtering software.)

It takes time and effort for the individual user to prioritize incoming Emails into multiple folders based on such rules.

SUMMARY OF THE INVENTION

Briefly, the present invention comprises in one embodiment, an Email guarantee deposit method, comprising the steps of: receiving from a sender a request to send to a recipient an Email; receiving a deposit or an authorization to obtain a deposit of something of value; sending the Email to the recipient only if a deposit of authorization for a deposit is received; determining if the recipient has accepted the deposit; and if the recipient has accepted the deposit, then facilitating the disposal of the deposit.

In a further aspect of the present invention, the facilitating step includes the step of exercising the authorization to obtain the deposit.

In a further aspect of the present invention, the step is provided of maintaining a directory of Email addresses; and obtaining an Email address for the recipient from the directory.

In a further aspect of the present invention, the steps are provided of: before the sending step, correlating the deposit with a threshold value set by the recipient; and only performing the sending step if the deposit equals or exceeds the threshold value set by the recipient.

In a further embodiment of the present invention, an Email address access method is provided, comprising the steps of: receiving from a sender a request to send to a recipient an Email; receiving a payment or an authorization to obtain a deposit of something of value; determining if the deposit equals or exceeds a threshold value; and if the payment equals or exceeds the threshold payment, then sending the Email to the recipient.

In a further aspect of the present invention, the step is provided of sending at least part of the threshold payment to the recipient.

In a further embodiment of the present invention, a program product is provided for an Email guarantee deposit method, comprising machine-readable program code for causing a machine to perform the following method steps: receiving from a sender a request to send to a recipient an Email; receiving a deposit or an authorization to obtain a deposit of something of value; sending the Email to the recipient only if a deposit of authorization for a deposit is received; determining if the recipient has activated the deposit; and if the recipient has accepted the deposit, then facilitating the disposal of the deposit.

In a further embodiment of the present invention, an Email guarantee deposit system is provided, comprising: a component for receiving from a sender a request to send to a recipient an Email; a component for receiving a deposit or an authorization to obtain a deposit of something of value; a component for sending the Email to the recipient only if a deposit of authorization for a deposit is received; a component for determining if the recipient has accepted the deposit; and a component for, if the recipient has accepted the deposit, then facilitating the disposal of the deposit.

In a further embodiment of the present invention, an Email guarantee deposit method is provided, comprising the steps of: receiving from a sender a request to send to a recipient an Email with a visual or auditory signal or with other emphasis or to route the Email to designated type of device; receiving a deposit or an authorization to obtain a deposit of something of value; sending the Email to the recipient with such a visual or auditory signal or other emphasis or routing the Email to the designated type of device only if a deposit of authorization for a deposit is received; determining if the recipient has accepted the deposit; and if the recipient has accepted the deposit, then facilitating the disposal of the deposit.

In a further embodiment of the present invention, an Email address access method is provided, comprising the steps of: receiving from a sender a request to send to a recipient an Email with a visual or auditory signal or with other emphasis or routed to a designated type of device; receiving a payment or an authorization to obtain a deposit of something of value; determining if the deposit equals or exceeds a threshold value; and if the payment equals or exceeds the threshold payment, then sending the Email with said signal or emphasis to the recipient.

In a further embodiment of the present invention, a program product is provided for an Email guarantee deposit method, comprising machine-readable program code for causing a machine to perform the following method steps: receiving from a sender a request to send to a recipient an Email with a visual or auditory signal or with other emphasis or routed to a designated type of device; receiving a deposit or an authorization to obtain a deposit of something of value; sending the Email with said signal or emphasis to the recipient only if the deposit or authorization for the deposit is received; determining if the recipient has activated the deposit; and if the recipient has accepted the deposit, then facilitating the disposal of the deposit.

In a further embodiment of the present invention, an Email guarantee deposit system is provided, comprising: a component for receiving from a sender a request to send to a recipient an Email with a visual or auditory signal or with other visual emphasis or routing to a designated type of device; a component for receiving a deposit or an authorization to obtain a deposit of something of value; a component for sending the Email with said visual or auditory signal or emphasis to the recipient or routing the Email to the designated device; a component for determining if the recipient has accepted the deposit; and a component for, if the recipient has accepted the deposit, then facilitating the disposal of the deposit.

DETAILED DESCRIPTION OF THE PREFERRED EMBODIMENT

Figure 1:
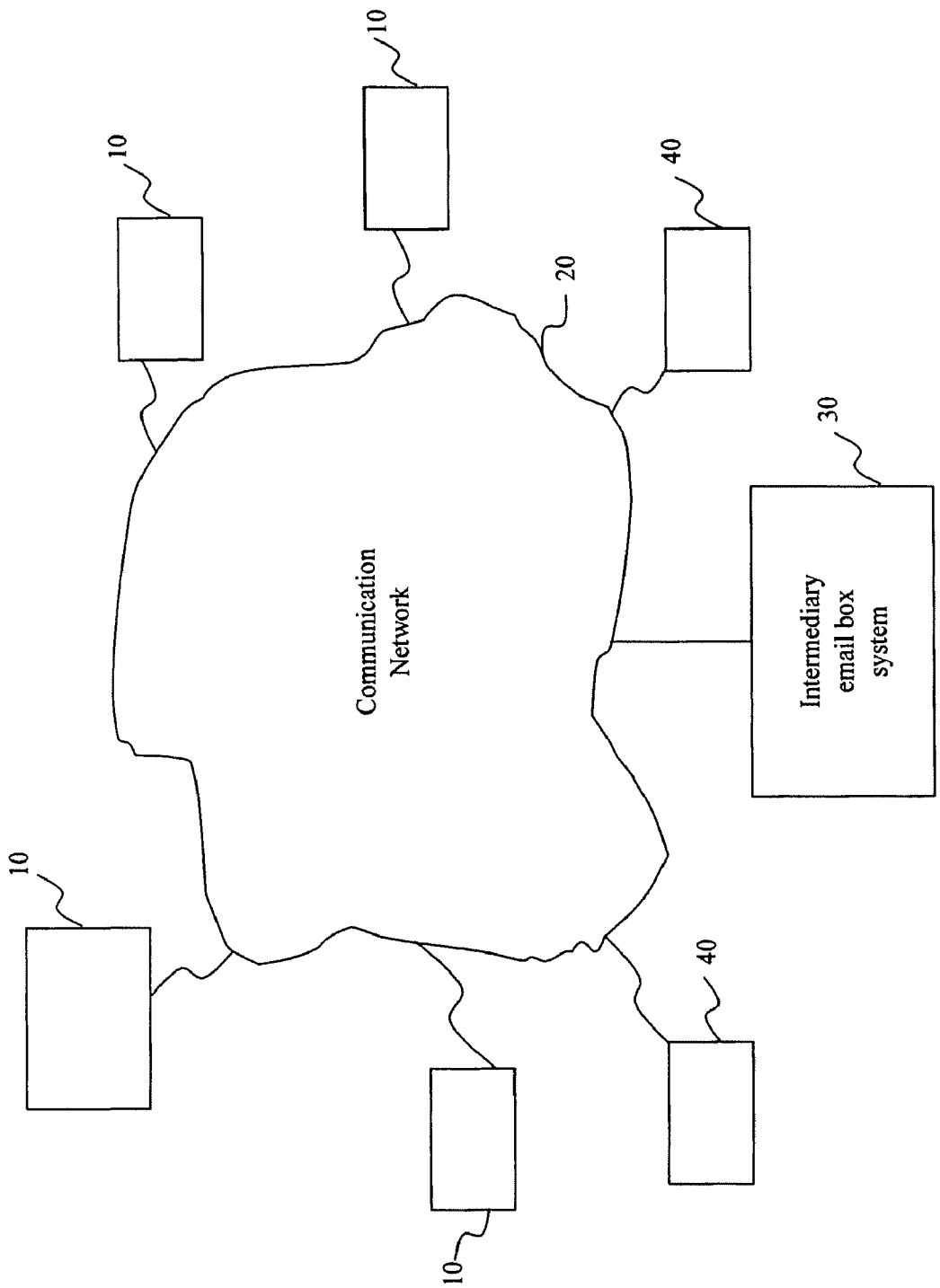
FIG. 1 is a schematic block diagram of an overall context for the present invention.

The present invention solves the foregoing problems, in one embodiment, by allowing users/potential recipients to grant others the right to send the users Emails on the condition that any sender of an Email pays a fee in the event that the user/recipient considers the Email to be an unwanted intrusion. This fee will deter most senders of unwanted commercial Emails ("spam").

Users who wish to grant others access to their Email inbox, publish a permanent "intermediary" Email address which is different from their primary Email inbox. The term "intermediary Email box" is intended to be construed broadly to include any kind of conceivable device or receiving area, with or without storage, that processes an incoming message and rejects the message or rejects a request for additional mailing rights if the message does not come with a requisite deposit.

Alternatively, instead of publishing an intermediary address, users could simply publish a link at a website through which others could have access to that intermediary Email address by clicking on it and typing the text of the Email into a pre-set form.

Emails received at the intermediary inbox are forwarded to the recipient's primary Email address only if the sender insures the mailing with a deposit or an authorization for a deposit of something of value. There may be a threshold pre-set by the user/recipient or the system and published with his/her Email address, which must be met. The recipient can waive or accept payment of this deposit fee at his option, or the deposit can be made automatically.

The directory aspect of the present invention can also be setup for the explicit purpose of inviting senders to pay for access to the user's Email inbox. Note that in a preferred embodiment, the user's primary Email address is never disclosed during the process.

Another embodiment of the present invention allows the mailing to a transit Email address even without a guarantee deposit but only for the purpose of requesting mailing rights and subject to strong restrictions regarding the amount of text in the message: The system could be set to allow the requester to only input his name, the standard request for mailing rights itself and, possibly, a very limited number of words (in one embodiment, not more than 3 to 5 words in a confined space) that will help the recipient recognize the sender in the event the recipient does not recognize the sender by his name alone (for instance, "Schwab investment advisor met yesterday" would let the recipient know that the person requesting the mailing rights is the Schwab Corporation Investment Advisor whom he/she met at a party on October 30 and to whom he/she had expressed an interest in learning more about potential investments.) Such a request would be made in a pre-set format. This mechanism would allow non-spammers to make such requests for mailing rights while restricting the ability of spammers to use the directory to send commercial messages.

Another way of implementing the invention is to allow users to specify that they only wish to receive Emails without a deposit from a certain list of pre-determined Email addresses. By default, Emails that arrive from any other Email address are sent back to the sender with a notice that they must be insured in the above described manner before they will be relayed to the primary Email inbox of the recipient. If the sender then insures the Email, the recipient could have the additional option of adding the senders' Email address to his/her list of approved Email addresses from which he/she can receive Emails even if they are not insured. In this manner of using the invention, a user would be able to freely and widely publish his primary Email address rather than a secondary Email address without fear of receiving excessive spam.

Yet another implementation of the invention is to make other or additional mailing rights contingent on the submission of a deposit. Separately or additionally, deposits would be required to send an Email that is not only placed in the Email inbox of a recipient but that alerts the recipient of a particularly urgent communication at the time that the Email arrives in the Inbox with an auditory or visual signal. Alternatively, Emails that are insured in this manner with a special deposit could be visually emphasized or ranked higher in a particular Email inbox so as to be read first and be more likely to command the attention of the recipient. Similarly, to the other implementation methods above, the recipient would have the option of accepting the deposit in the event that he or she deems the interruption or the additional emphasis inappropriate, intrusive or unjustified. A deposit could also be required to route an Email to the handheld personal digital assistant or to the cellular phone of the recipient instead of to the regular Email inbox which he normally accesses through his computer. To route an Email to a hand-held device such as a PDA or a Cell phone or to add auditory or visual interruption signals, a particular recipient would presumably require higher deposits than those that are required for the mailing of a regular Email that goes to the standard Email inbox. Note that such additional contingent mailing rights do not have to be granted indiscriminately to anyone willing to make the required deposit, but could be made available selectively to certain groups of individuals, such as those working at a particular company.

Referring now to FIG. 1, there is shown a schematic block diagram illustrating the high level components of an overall system configuration for implementing a preferred embodiment of the present invention. A plurality of client computer systems 10 are connected through a communications network 20. Each of the plurality of the client computer systems 10 could include portions of the processing software to be discussed below. Each of a plurality of the client computer systems 10 is connected through the communications network 20 to one or more processors 30 that contain the processing software to be described to implement the Email box system of the present invention. It is contemplated that there be a one or more data bases for storing communications information about the various clients 10 may be maintained at one or more of the processors 30. Additionally, it is contemplated that one or more vendor computers 40 will be connected to the communications network 20.

In a preferred embodiment, the communications network 20 is the Internet. The term "Internet" is defined to mean a collection of interconnected or disconnected networks (public and/or private) that are linked together by a set of standard protocols (such as TCP/IP, for example) to form a global, distributed network. While this term is intended to refer to what is now commonly known as the Internet, it is also intended to encompass variations which may be made in the future, including changes and additions to existing standard protocols.

However, the communications network 20 can also include a wide area network (WAN), an internet network, a public tariff telephone network or a private value added network (VAN). Alternatively, the communication network can be implemented using any combination of these different kinds of communication networks. It will be appreciated that many other similar configurations are within the abilities of one skilled in the art and all of these configurations could be used with the method of the present invention. Furthermore, it should be recognized that the computer system and network disclosed herein can be programmed and configured in a variety of different manners by one skilled in the art, to implement the method steps discussed further herein.

The client blocks 10 in FIG. 1 are conveniently configured as computers which may communicate with the communications network 20. However, the present invention is not limited to the use of computers. In this regard, a variety of convenient mechanisms can be used to implement the client 10, including hand held devices. More generally, a client can be a PC, telephone, PDA, appliance, etc. equipped with an industry-standard (HTTP, FTP, WAP, HTML, XML, WML, cHTML, HDML, etc.) browser or other communications protocol having wired (Ethernet, Token Ring, etc.) or wireless (cellular, Bluetooth, IEEE 802.11b, etc.) access via networking (UPnP, TCP/IP, Novell, NetBUI, Appletalk, etc.) to nearby and/or remote peripherals, devices, appliances, etc. The preferred embodiment will focus upon a device that utilizes the TCP/IP (transfer control protocol/Internet protocol) for communication between clients or between clients and servers, each client device having an internal TCP/IP/hardware protocol stack, where the "hardware" portion of the protocol stack could be Ethernet, Token Ring, Bluetooth, IEEE 802.11b, or whatever software protocol is needed to facilitate the transfer of IP packets over a local area network.

If the blocks 10 are implemented as computers, they would typically include customary components of a computer system including a CPU, a display, a keyboard and/or other I/O device, a network card or other communications interface, RAM or ROM or other memory, as well as storage such as disks and/or CDROM drives. (However, the client may be other browser equipped or communication program equipped devices as described above.) The monitor may be any conventional off-the-shelf monitor. The preferred operating system is Windows 2000 or XP. As noted in the preferred embodiment, within each personal computer, an internet browser such as Netscape or Internet Explorer is stored for use. Also in the preferred embodiment, the browser is linked to network 20 via the TCP/IP protocol stack.

Likewise, the blocks 40 representing the vendors and others wishing to communicate with the clients 10, will also typically be implemented by means of a computer, but could be implemented by hand held devices or other convenient devices.

The processor 30 is representative only, and may be comprised of a single processor. Alternatively, the functionality of the processing system could be implemented with several processor systems that are connected over a network. It is also possible to distribute the functionality of the processing system over a multitude of sites which are suitably connected together using conventional networking or inter-networking techniques.

In a preferred embodiment, the Email system of the present invention may be provided by a web service which includes the processor 30. The term "web service" is intended to refer to a service that is provided (at least in part) by a web server. But a web service is a broader concept than a web server. In this regard, a web server is a program that, utilizing the client/server model and the World Wide Web Hypertext Transfer Protocol, serves files that form Web pages to web users whose computers contain HTTP clients that forward their requests. Every computer on the Internet that contains a Web site must have a Web server program. The most popular web servers currently are Microsoft's Internet Information Server which comes with the Windows NT server, Netscape Fast Track and Enterprise servers, and Apache, a Web server popular on UNIX-based operating systems (but available for Windows as well). Web servers often come as part of a larger package of Internet and Intranet-related programs for serving e-mail, downloading requests for File Transfer Protocol files, and building and publishing Web pages. It is this larger package which is referred to as the web service.

Typically a web service will include a Web site which corresponds to a particular Internet domain name, such as "Landesmann.com", and includes the web content associated with one or more particular operations. The term "Web site" is generally intended to encompass both (i) the hardware/software server components that serve informational content over the network, and (ii) the "back end" hardware/software components, including any non-standard or specialized components, that interact with the server components to perform services for the Web site user.

Figure 2:
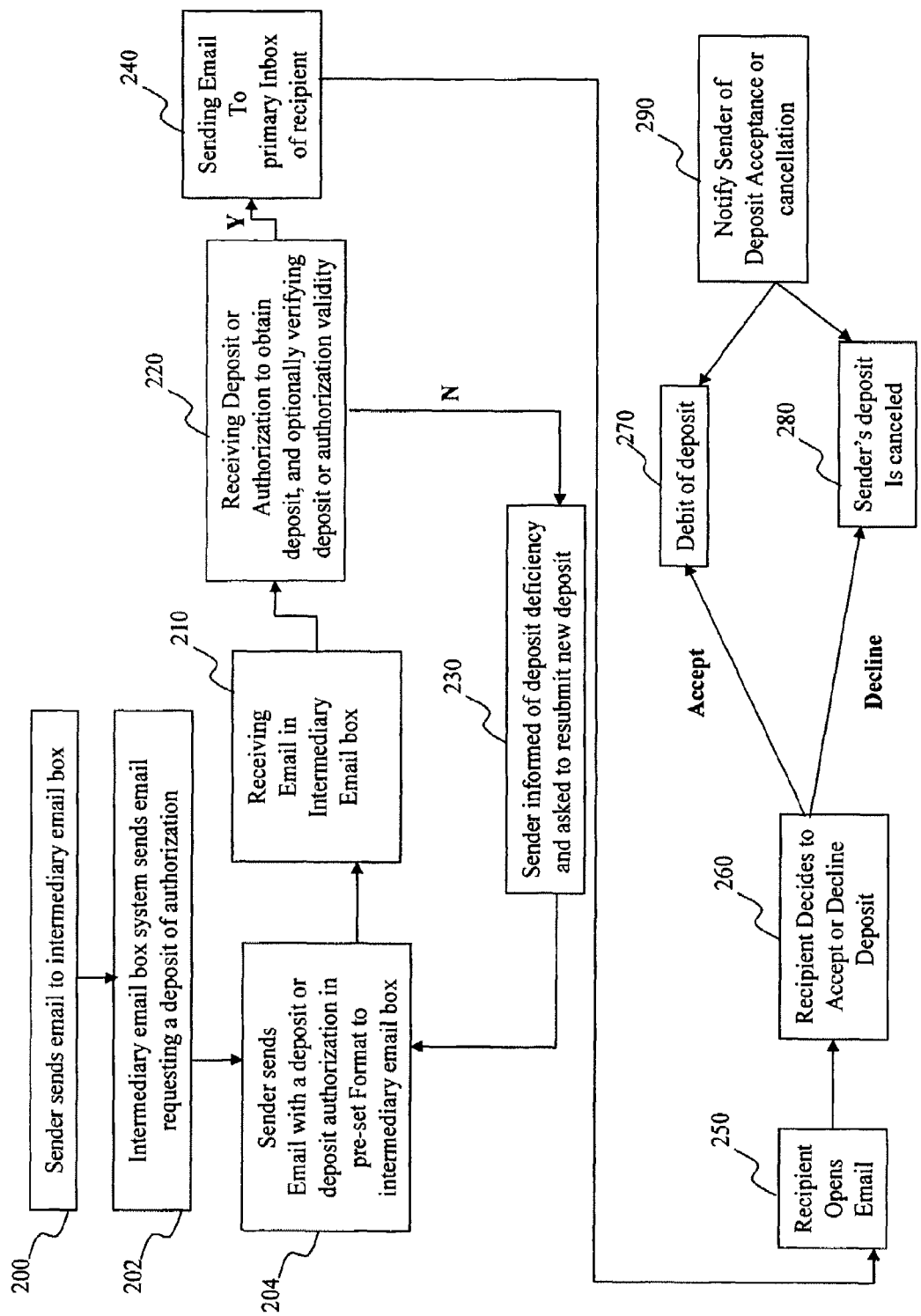
FIG. 2 is a flowchart of a preferred embodiment of the present invention.

Referring now to FIG. 2, an embodiment for one aspect of the present invention is illustrated.

The process may be initiated by a sender obtaining an Email box address for a particular user/recipient. This might be a secondary intermediary Email address of the recipient which the recipient has made available directly or indirectly to the sender, and which is different from the recipient's primary Email address. The sender sends the Email to this address. This is illustrated by block 200. In block 202, the Email box system receives this Email from the sender and instead of placing or forwarding the Email into the inbox of the recipient, sends in response an Email requesting a deposit or an authorization for a deposit. Typically, this deposit will be for a pre-set threshold amount.

In block 204, the sender sends an Email with a deposit or a deposit authorization in a preset format. Note that the term "Email" is intended to encompass any type of network communication. The sender would send his Email to the intermediary Email box at the processor 30, which effectively acts as a bridge or triage and transit station for the Email, and operates to relay the Email to the sender under certain conditions, but not under other conditions. Note that after the sender has the correct intermediary Email box address and the correct threshold amount and any pre-set format for the communication, blocks 200 and 202 can be bypassed when the sender wishes to send another Email to the same recipient.

In block 210, the intermediary Email box receives the Email from the sender. This block 210 includes one or more subsidiary steps. As noted, the system is set up with a pre-set threshold deposit requirement. This pre-set threshold deposit requirement may be a standard deposit value set by the system. Alternatively, the pre-set deposit value could be set by the user/recipient. In the situation where the user/recipient has pre-set the threshold value for the deposit, in block 220 the user's pre-set threshold must be obtained. Typically, the user's pre-set threshold value would be associated with the user's intermediary Email address. Alternatively, the user's intermediary Email address could be used as a reference to access this pre-set threshold value.

Accordingly, the block 210 would determine whether the deposit or the authorization for the deposit is for a value which equals or exceeds the threshold value which has been pre-set by the user/recipient or the system. Another optional step could be performed in block 210 if the intermediary Email box is provided with an expiration date. In this instance, the date of the sender's Email could be compared with the expiration date of the intermediary Email box, and the process would continue only if the sender's Email date is prior to the expiration date of the intermediary Email box.

Note that block 210 could also include a subsidiary step of comparing the sender's Email address to a list of Email addresses that the recipient will accept without the payment of a deposit. Accordingly, the deposit process can be bypassed for a selected set of senders designated by the recipient. The populating of such a list of senders could be accomplished during the setup of the intermediary Email box by the recipient, and may also be performed on an ad hoc basis as the recipient determines that this privilege should be extended to a new sender.

Senders who frequently send Email to intermediary Email boxes could keep a copy of the form that is sent by the intermediary web site on their hard drives or in other convenient storage so that this form could be pre-completed with payment information (credit card or micro payment account, for example). This pre-completed payment form would speed-up the process of sending of Emails. Alternatively, the sender's Email outbox could be linked to an account of the sender held by the company administering the intermediary Email box service. This account could be automatically debited whenever the sender makes a request to send an Email to a recipient through this intermediary Email box.

In block 220, the deposit or an authorization for a deposit of something of value, typically money, is received at the intermediary Email site. The deposit could be by means of a credit card number or a debit card number, for example. Note that the recitation "intermediary" Email box in this context is also intended to encompass other designated locations where the deposit or the authorization for the deposit might be sent, with a verification message sent to the intermediary Email box.

In block 230, if it has been determined that the deposit or the authorization for the deposit does not equal or exceed the pre-set threshold or if the deposit or authorization for deposit cannot be verified, then a message is sent to the sender informing him/her of the deficiency in his/her deposit and requesting a resubmittal of a new deposit.

Alternatively, if the deposit or authorization for the deposit has been verified and does equal or exceed any optional pre-set threshold value, then in block 240 the Email is sent to the primary inbox of the recipient.

In the event that other mailing rights are authorized as the result of the deposit, such as routing the Email to the personal digital assistant or cell phone of the recipient or alerting the recipient with a visual or auditory signal, the particular action that has been authorized as a result of the deposit is then taken in block 240.

In block 250, the recipient opens his Email. In block 260, the recipient decides whether to accept or decline the guaranteed deposit payment. In order to implement this step, by way of example the forwarded Email could be provided with web content to display buttons labeled "Accept" and "Decline," with hyperlinks to appropriate network locations.

Referring to block 270, if the user clicks the "Accept" button, then the deposit may be debited. Note that the debiting of the deposit may be made to the user/recipient's account, or to any other selected account. By way of example, the debit could be made to a charity, for example.

Alternatively, if the user/recipient clicks the button "Decline", then in block 280 the sender's deposit or authorization for deposit may be canceled.

In block 290, the system automatically sends a message to the sender notifying the sender of the recipient's acceptance or cancellation decision for the deposit.

It should be noted that a default decision may be set by the user for deposits in block 260. In this regard, the default could be set to automatically accept all deposits. Alternatively, the default could be set to automatically decline all deposits.

Figure 3:
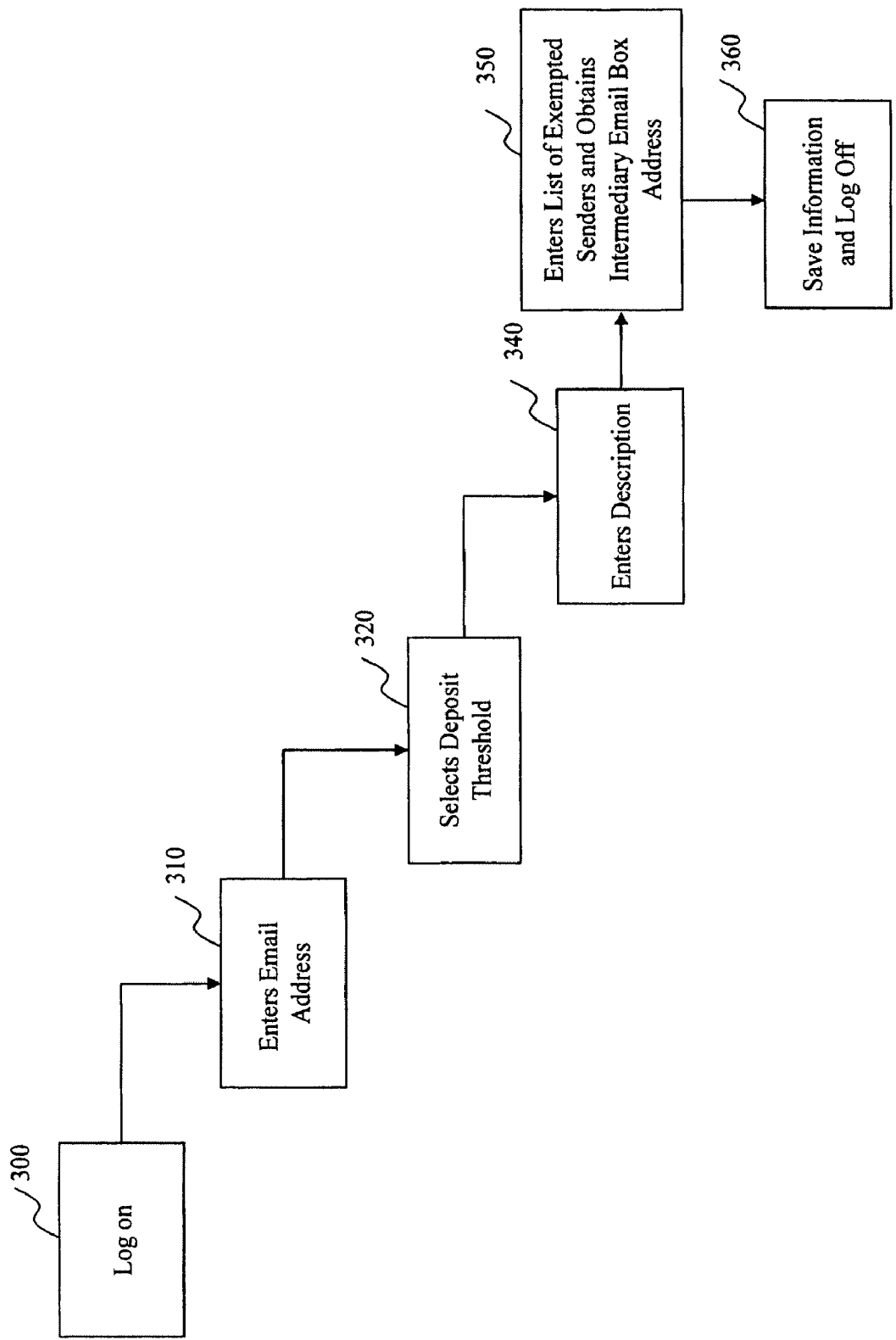
FIG. 3 is a flowchart of a preferred embodiment of another aspect of the present invention.

Referring now to FIG. 3, there is shown a preferred embodiment for a setup of the contingent mailing rights by the recipient. In this embodiment, the directory system is operated by one or more servers on one or more web sites. A user would access the web site by inputting the appropriate Internet address into the user's browser. The user would then log on to the web site in block 300. In block 310, the user enters the user's primary Email address. In the event that the user's primary Email address has previously been stored in the data base for the web site, the field for the user's primary Email address may be pre-populated with his/her primary address. Typically, this might occur where the user wished to perform some management function with respect to the settings for his intermediate Email box.

Referring now to block 320, the user selects the amount of the deposit to be requested from potential senders. In one aspect of the implementation for block 320, the user could provide different deposit requirements for different senders, or different types of senders. For such an implementation, block 320 would provide web content for receiving input from the user for a plurality of deposit threshold values, and the senders or type of senders that those different threshold values would apply to. For example, the user may require a different higher deposit before an auditory or visual enhancements may be activated by a sender. The user may set an even higher deposit threshold to be paid before routing to the user's cell phone or PDA may be activated by a sender.

Note that if an enhanced version of the system is set up for the user/recipient, wherein different levels of threshold deposit values have been set for different senders or different types of senders, then when an Email from a sender is received by the intermediary Email box system, then in block 202 the intermediary Email box system determines the appropriate threshold deposit level for that particular sender or class of senders by means of comparison to a table of senders or via another convenient method, and then sends the appropriate threshold deposit level information back to the sender. The appropriate threshold deposit level is then used in block 210 to determine whether the deposit amount or authorization for the deposit sent by the sender equals or exceeds this threshold deposit value.

In block 340, the user inputs a description of himself/herself and the user's background. This information may be used for the purpose of distinguishing between several people with the same or similar names, so that a user of the Email will not send an Email to a person other than the intended recipient. At the option of the user/recipient, this information could also be used for other market-driven purposes.

In block 350, the user may be prompted by web content on his browser to enter a list of exempted senders, who would be exempted from the deposit requirements. In this block or an earlier block the user may select an intermediary Email box address or may be given an intermediate Email address by the system.

In block 360, the user would then save this information and log off.

Figure 4:
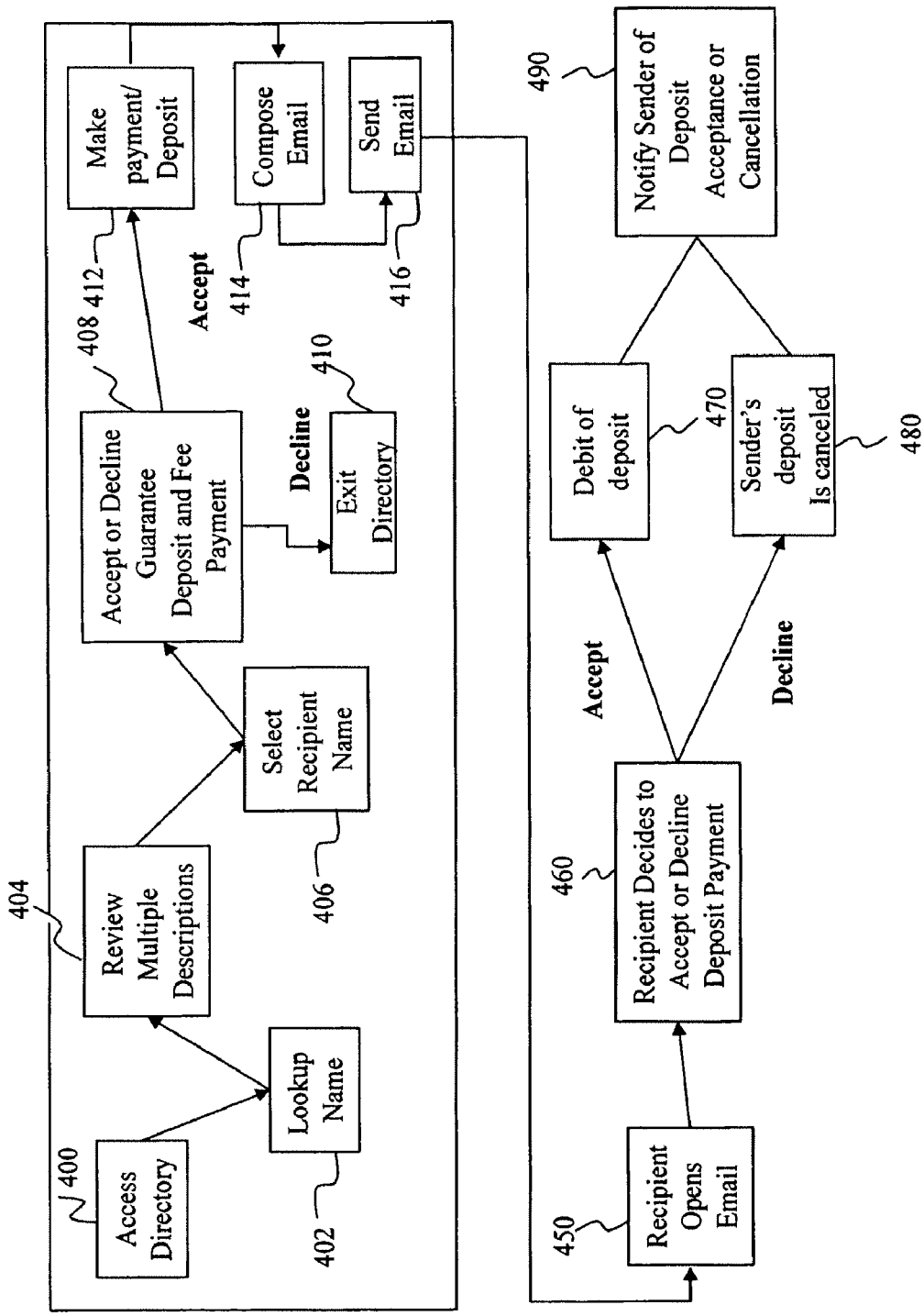
FIG. 4 is a flowchart of a method for using a preferred embodiment of the directory invention.

Referring now to FIG. 4, there is shown a preferred embodiment for one aspect of the present invention. FIG. 4 shows a description of the operation of the system by a sender who wishes to send an Email to another person by accessing a directory at the web site. In block 400, the sender accesses the directory at the web site by logging on to the web site service and selecting a directory feature. In block 402, the sender looks up the name for his desired recipient. In block 404, in a situation where there are multiple recipients with similar names, the user may access the description for a particular user to ensure that it is addressing the Email to the appropriate intermediary Email box. In block 406, the sender selects the appropriate recipient's name. Typically, this selection would be accomplished by clicking on the name. In block 408, the sender would then be presented via appropriate web content with a screen which describes the deposit requirement for normal routing to the intermediary Email box, as well as options (if any) for Email enhancements or special routing (to be discussed below) and the required deposit amounts therefore, and acceptable payment mechanisms, and presents a set of buttons, or other appropriate means for the sender to Accept or Decline the deposit. If the sender declines the deposit requirement, then in block 410, the directory is exited.

In more detail, these Email enhancement in block 408 might include web content to provide a screen or other user interface for offering a method of alerting the recipient of the particular Email with an auditory and/or visual signal, which would be presented to the user at a convenient time, typically during processing of the user's Email. For example, program code could be added to cause an auditory beep or other sound or words to be made at a predetermined time to the user, and/or a highlighting of the Email visually, or the addition of words, or icons, or designs to indicate urgency for this particular Email. Alternatively or in addition, the Email could be ranked higher in the Email box so as to be read earlier than its receipt time would entitle it. Alternatively, or in addition, a selection screen could be presented to sender to route the Email additionally to or only to another Email receiving device, such as a hand-held device like a PDA or a cell phone, with or without auditory or visual enhancement. As noted above, additional deposits or different deposits may be required for adding one or more Email enhancements or for routing the Email to selected other devices, such as hand-held devices.

Alternatively, note that the present invention may also be set up to pass all Emails to the recipient, with enhancement of the Email or the routing of the Email to selected other devices only occurring if the requisite deposit is received.

If the sender accepts the deposit requirements by making the appropriate indications on his screen, then in block 412, the sender is presented by the appropriate web content, with a screen to provide account information for making payments of the deposit or providing an authorization to obtain a deposit.

In block 414, the sender then composes his/her Email and in block 416, the sender sends the Email which—assuming that the deposit is sufficient—is relayed to the Email inbox of the desired recipient. In the event that other mailing rights are authorized as the result of the deposit, such as routing the Email to the personal digital assistant or cell phone of the recipient or alerting the recipient with a visual or auditory signal, then in block 416 program code is added to facilitate at the appropriate time the particular action that has been authorized as a result of the deposit.

The operation of blocks 450, 460, 470, 480, and 490, may be substantially as described for FIG. 2.

Note that the option for enhanced Email described above for FIG. 4 may also be implemented for FIG. 2. It should be noted that the amount of the deposit may include a fee for the operation of the intermediary Email box system.

As noted earlier, the insurance deposit payment generally will be paid to the recipient in the event that he accepts the payment but that is not necessarily the case. The payment could also go to charity or to another third party on whose behalf the recipient could accept the deposit. The main purpose of the deposit is to deter senders of unwanted commercial Emails from using the directory.

As noted above, people are reluctant to publish their Email addresses in publicly available directories. In accordance with one embodiment of the present invention, individuals may publish a permanent or temporary "intermediary" Email address which is different from their primary Email inbox. Emails going to that intermediary inbox are forwarded to the recipient's primary Email address only if the sender insures the mailing with a deposit fee, at a threshold set by the recipient or the system and published with his/her Email address. The recipient can waive this fee at his/her option.

The directory aspect of the present invention can also be setup for the explicit purpose of inviting senders to pay for access to one's Email inbox. Prominent individuals and community leaders can make their Email inboxes (and by extension, themselves) available for a fee.

Another embodiment of the directory aspect of the present invention is that it allows mailing to an intermediary Email address even without a guarantee deposit but only for the purpose of requesting mailing rights and subject to strong restrictions regarding the amount of text in the message: The requester can only give his name, a standard request for mailing rights itself and, possibly, a very limited number of words (probably not more than 3 to 5 words) that will help the recipient recognize the sender for those situations where the recipient does not recognize the sender by his/her name alone (for instance, "Schwab investment advisor met yesterday," would let the recipient know that the person requesting the mailing rights is the Schwab Corporation Investment Advisor whom he/she met at a party on October 30 and to whom he/she had expressed an interest in learning more about potential investments.) Such a request would be made in a pre-set format. This mechanism would allow non-spammers to make such requests for mailing rights while restricting the ability of spammers to use the directory to send commercial messages.

Figure 5:
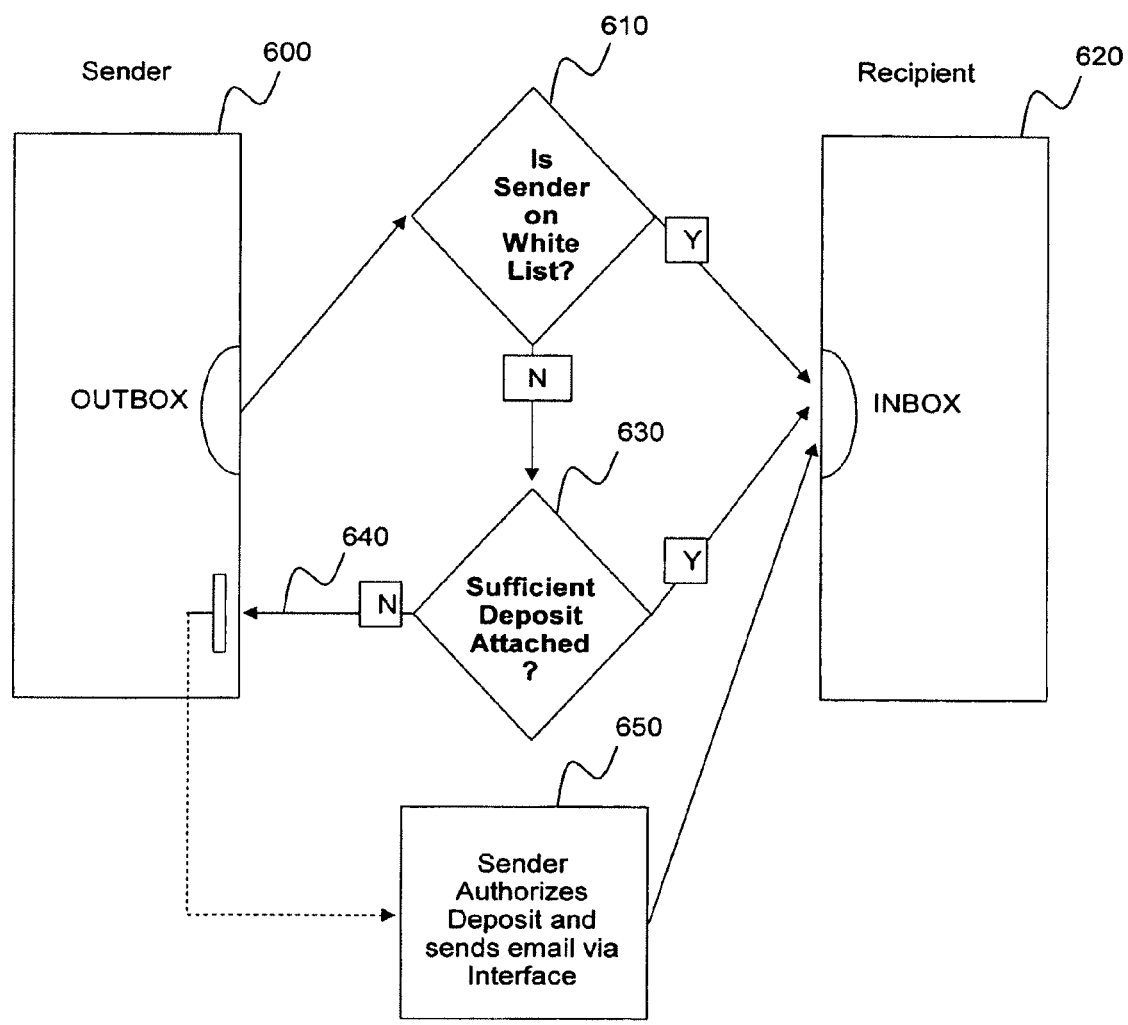
FIG. 5 is a flowchart of a further embodiment of the invention.
Figure 6:
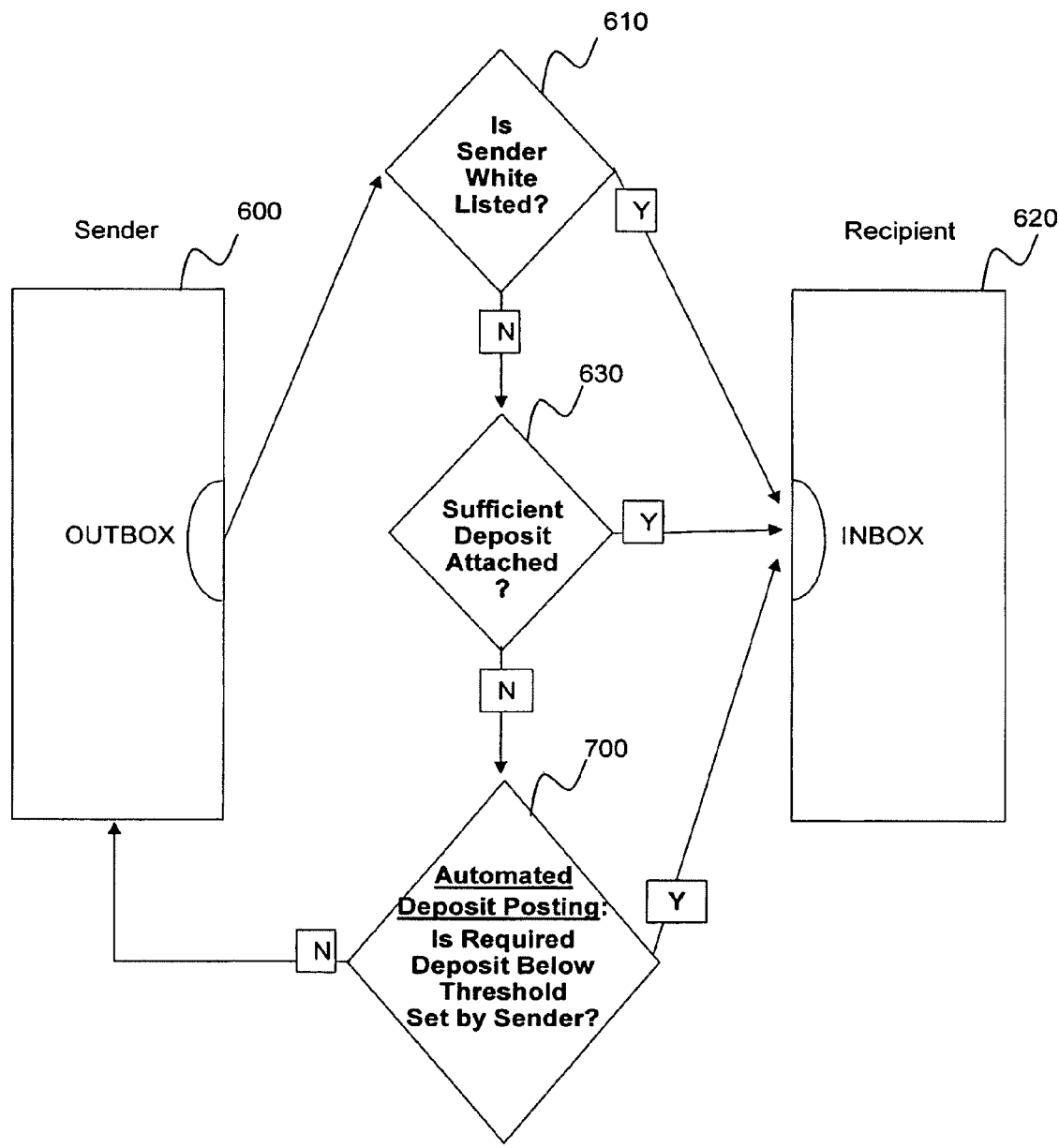
FIG. 6 is a flowchart of a yet further embodiment of the invention.

As shown in FIGS. 5 and 6, the functionality of the present system can be improved by allowing senders to set rules for automated deposit. In particular, senders can request the system to automatically post a deposit for which they are liable if it is collected by the recipient. Thus for every email a sender sends out and which the sender makes subject to these automated rules, the system would automatically post a deposit if and when the email gets rejected or rerouted. Such a rejection or rerouting would have happened because the recipient of the email is a user of the present system and because s/he has required that some or all senders who wish to send and route emails to her/his (the recipient's) designated email inbox must post a deposit to do so.

Because of this automated rule operation the sender does not have to react to such a rejection and go through the trouble of posting the deposit in the event of rejection. Instead he can safely assume that all his emails will reach their destination. Because he is a sender of legitimate emails he is likely to trust the system to post deposits without fear of undue loss. Nevertheless, in one embodiment, such automated deposit operation will be subject to cumulative and instance-specific limits placed on each made deposit. These limits may be set by the sender and the system and could comprise rules for example, that could vary the deposit limits depending on whether the recipient has previously been emailed by the sender, depending on the quality or reputability or size of the domain name and/or based on other factors such as location of the recipient, inferred zip code of the recipient or any other information that may be available to the sender through third parties.

Referring to FIG. 5, in an embodiment of the invention which does not make the automated deposit-making feature available to the sender, the outgoing email leaves the outbox 600 of the sender. The logical chain of the inventive system than moves to the next step in block 610, and the question is asked whether or not the sender is on the accepted list, i.e., the white list. If the sender is on the White List, the email is delivered to the recipient inbox 620 unimpeded. If the sender is not, the next step is represented by block 630 in which the presence or absence of a deposit required by the recipient for non-white listed senders is verified. If the requisite deposit is absent, the system automatically sends via line 640 a message back to the sender, notifying him of the recipient's policy of only accepting email from unknown senders if they bear that deposit (at the level set by the recipient).

The sender then uses a web-based interface to attach a one-time deposit to the message, and the message is re-sent with the deposit attached (as represented by the block 650). The message is delivered to the recipient and judged as either desired or not. If the message is desired, the recipient has the option of not accepting/taking the deposit. The recipient may also add the sender's email address to the White List, providing for seamless delivery from that address in the future. If the message is deemed unwanted, the deposit is forfeit.

As shown by the schematic diagram in FIG. 6, the automated deposit making feature allows the sender to avoid having to authorize the making or make individual deposits when an email is returned, as described above, because of an absent or insufficient deposit. Whenever an email is rejected by the system, such as because the sender is not on the White List and does not contain a sufficient deposit or authorization for a deposit, then based on previous setup instructions and rule-based authorizations provided by the sender, the process of the inventive system that includes the automated deposit making feature moves from block 630 in which an absent or inadequate deposit is found to block 700. In block 700 the question is asked whether or not the deposit required by the recipient meets the explicit or an inferred maximum threshold or group of thresholds set based on the previous instructions provided by the sender. The sender could set different maximum thresholds that are selected based on one or more rules set by the sender. Such maximum threshold or set of thresholds prevents abuse of this automatic deposit feature by recipients.

Before the system authorizes the deposit, optionally, the authenticity of the return email could be analyzed by the system to verify that the return email that is returned to the sender because of a purportedly inadequate or absent deposit, is in fact an authentic and genuine return email that is sent from the system of the recipient and in response to an earlier email sent by the sender. This is done to protect the sender against the automated and malicious depletion of his financial accounts. Fake return emails sent to the Sender could prompt the system to make deposits on the Sender's behalf and these deposits would then be collected by those requesting them under the false pretense, that for each required deposit an earlier email had been sent by the Sender.

Multiple ways of verifying the authenticity of such deposit-request-bearing return emails are well known in the prior art at the time of invention. In one embodiment for the automated deposit making feature, the system of the sender would simply have to compare information associated with the return email with information associated with the originating outgoing email (the email to which the return email purportedly responds.) To accomplish this, outgoing emails would be stored in a storage associated and controlled by the sender. The return email could then be analyzed to determine whether it is indeed a reply to the originating email. Various techniques are known for preventing the forging of return emails even by someone who has unauthorized access to the content of specific outgoing emails. (For instance, random numbers could be included in each originating sender email, in which some of the numbers vary with the time and date of the sending and some do not, and where it is not known or disclosed which of the numbers vary except to the system of the sender. The return email could then be verified to determine whether or not the non-varying numbers are contained in it, and whether or not the numbers that vary with the date and time of the return email in fact are different from the numbers of the originating email.)

Returning to FIG. 6, if it is determined in block 700 that the required threshold set by the sender is met, the system would automatically make the deposit on behalf of the sender, and the email would then be forwarded to the recipient inbox 620. In the opposite case, if the threshold is not met, the system would return the email to the sender 600 with an explanation. Optionally, the sender could then be allowed, for example, via an electronic interface, to authorized the posting of the deposit to allow the sender to complete the transmission of his email to the recipient.

It should be noted that although the flow charts provided herein show a specific order of method steps, it is understood that the order of these steps may differ from what is depicted. Also two or more steps may be performed concurrently or with partial concurrence. Such variation will depend on the software and hardware systems chosen, and more generally, on designer choice. It is understood that all such variations are within the scope of the invention. Likewise, software and web implementation of the present invention could be accomplished with standard programming techniques with rule based logic and/or other logic to accomplish the various database searching steps, correlation steps, comparison steps and decision steps. It should also be noted that the word "component" as used herein and in the claims is intended to encompass implementations using one or more lines of software code, and/or hardware implementations, and/or equipment for receiving manual inputs.

The foregoing description of a preferred embodiments of the invention has been presented for purposes of illustration and description. It is not intended to be exhaustive nor to limit the invention to the precise form disclosed, and modifications and variations are possible in light of the above teachings or may be acquired from practice of the invention. The embodiments were chosen and described in order to explain the principals of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. An Email guarantee method for operating a system, the system comprising one or more computers, the method comprising:

the system receiving, by the one or more computers, from a sender first information associated with the sending of at least one Email to at least one human recipient;

the system determining, by the one or more computers, whether something of value has been received from or on behalf of the sender or control of a deposit guarantee associated with something of value held or maintained on behalf of the sender, that is associated with the Email, has been established, at the same time as or prior to the sending of the Email to the recipient;

after receipt of the first information from the sender, electronically sending or sending in a particular manner, by the one or more computers, the Email to a recipient inbox for the human recipient depending at least in part on whether or not the system has determined that the something of value has been received from or on behalf of the sender or that control of the deposit guarantee associated with the something of value held or maintained on behalf of the sender, that is associated with the Email, has been established;

evaluating second information, by the one or more computers, generated after receipt of the Email by the recipient inbox, the second information consistent with a decision by the human recipient to approve or disapprove the Email, said decision having been made subsequent to the receipt of the Email by the recipient inbox; and facilitating taking or not taking the something of value or a benefit arising from the something of value based at least in part on the evaluating step only at a time subsequent to the receipt of the Email by the recipient inbox.

2. The method as defined in claim 1, wherein the determining step comprises determining that control of a deposit guarantee associated with something of value held or maintained on behalf of the sender has been established, and wherein the facilitating taking of the something of value or benefit arising from the something of value comprises facilitating cancelation of an ownership right of the sender.

3. The method as defined in claim 2, wherein the facilitating or not facilitating taking step comprises facilitating or not facilitating the taking or not taking a benefit arising from the something of value.

4. The method as defined in claim 2, wherein the facilitating or not facilitating taking step comprises facilitating or not facilitating the taking or not taking the something of value.

5. The method as defined in claim 2, further comprising sending electronically to the recipient a facility for starting an electronic process to indicate approval or disapproval of the Email, and wherein the evaluation is made based at least in part on the receiving or not receiving of second information regarding whether or not the recipient has initiated the electronic process.

6. The method as defined in claim 5, wherein the sending or sending in a particular manner step comprises sending in a particular manner that is at least partly determinative of at least one of:

the email being placed in the recipient inbox, said recipient inbox being a priority-inbox;

the email being placed in the recipient inbox with an emphasis.

7. The method as defined in claim 1, wherein the something of value comprises a credit obtained in consideration for payment of a currency amount made by or on behalf of the sender, and the taking in the facilitating taking step results in an at least partial loss by or on behalf of the sender of the credit or of a right of refund to the currency amount.

8. The method as defined in claim 7, wherein the system receives third information consistent with a designation by the recipient that the sender should be designated as an allowed sender, and sending or sending in a particular manner Emails from the allowed sender based at least in part on said designation.

9. The method as defined in claim 1, wherein the determining step comprises determining that something of value has been received from or on behalf of the sender.

10. The method as defined in claim 9, wherein the something of value comprises a right to cause something to be forfeited, and wherein the facilitating or not facilitating step comprises initiating said forfeiture if a performance measure, that is based at least in part on the second information generated after receipt of the Email by the recipient inbox, indicates deficient performance on the part of the sender with respect to the Email.

11. The method as defined in claim 1, wherein the step of facilitating comprises facilitating transfer of at least part of the something of value or a second benefit arising from the something of value to a charity.

12. The method as defined in claim 1, further comprising:

adding, by the one or more computers, a designation for the sender to a white list comprising a privileged class of senders whose Emails are sent in a preferred manner relative to those of other senders based at least in part on said designation, even when there has been no receipt of something of value or a deposit guarantee of something of value for these emails or when there has only been a receipt or a deposit guarantee of something of value that is of lower value compared to other senders, said addition to the white list being or having been based at least in part on, or resulting at least in part from, an expression of approval made by the recipient in response to the Email, wherein the sending or sending in a particular manner step comprises using, by the one or more computers, the white list to determine whether to send Emails or whether or to send Emails in a preferred manner only with respect to the Emails addressed to the recipient.

13. The method as defined in claim 1, adding, by the one or more computers, a designation for the sender to a white list comprising a privileged class of senders whose Emails are sent in a preferred manner relative to those of other senders, even when there has been no receipt of something of value or a deposit guarantee of something of value for these emails or when there has only been a receipt or a deposit guarantee of something of value that is of lower value, said addition to the white list being or having been based at least in part on, or resulting at least in part from, an expression of approval made by the recipient in response to the Email, wherein the sending or sending in a particular manner step is comprised of using, by the one or more computers, the white list to determine whether or not to send Emails in a preferred manner to multiple recipients.

14. The method as defined in claims 1, 5, 7, 9, 2, 10, 4, 3, 11, or 6, further comprising:

adding, by the one or more computers, a designation for the sender to a white list comprising a privileged class of senders whose Emails are sent in a preferred manner relative to those of other senders based at least in part on said designation, even when there has been no receipt of something of value or a deposit guarantee of something of value for these emails or when there has only been a receipt or a deposit guarantee of something of value that is of lower value compared to other senders, said addition to the white list being or having been based at least in part on, or resulting at least in part from the second information having been indicative of the recipient having approved of to the Email.

15. The method as defined in claim 14, further comprising: receiving a payment from the sender, said payment made at least in part as consideration for the benefit received by the sender by sending the Email, and wherein said payment is at least in part non-reimbursable after the Email is sent, said partial or full non-reimbursability not depending on an indication of approval or disapproval of the human recipient.

16. The method as defined in claim 14, wherein the facilitating or not facilitating the taking or not taking of something of value or a benefit arising from the something of value consistent with the evaluating step only at a time subsequent to the receipt of the Email by the recipient inbox is performed by the one or more computers.

17. The method as defined in claim 14, wherein the something of value is a currency amount or a credit obtained in consideration for payment of a currency amount made by or on behalf of the sender, and the taking in the facilitating taking step initiates an at least partial loss by or on behalf of the sender of the credit and/or of a right of refund to the currency amount.

18. The method as defined in claim 14, further comprising: receiving directly or indirectly from the sender, by one or more computers, fourth information associated with sending a new email to one or more destination recipient inboxes;
determining, by the one or more computers, whether or not the sender is on the white list;
electronically sending or sending in a preferred manner, by the one or more computers, after receipt of the fourth information from the sender, the new email to the one or more destination Email inboxes depending at least in part on whether the sender has been determined to be on the white list.

19. The method as defined in claim 18, further comprising: receiving, by the one or more computers, at least one other Email from at least one other sender to at least one other recipient, said at least one other Email from the at least one other sender not being backed by a receipt of something of value or a deposit guarantee of something of value;
determining, by the one or more computers, whether the at least one other sender is on the white list;
blocking, by the one or more computers, the at least one other Email from being relayed to a respective at least one other-recipient-priority-inbox of the at least one other recipient, at least in part based on the determination that the at least one other sender is not on the white list.

20. The method as defined in claim 19, further comprising: facilitating referring the other sender to, or facilitating informing the other sender of, a program for obtaining mailing privileges for sending Emails via the system, said mailing privileges obtained at least in part by providing something of value or allowing for the establishment of a deposit guarantee of something of value.

21. The method as defined in claim 19, wherein the step of determining by the one or more computers, whether the at least one other Email should or should not be sent to the other-recipient-priority-inbox of the other recipient, is based at least in part on a number of Emails received from that sender.

22. The method as defined in claim 19, wherein said determining whether the at least one other Email should or should not be sent comprises:
determining, by the one or more computers, that the Email is not associated with an IP address of a blacklisted sender.

23. The method as defined in claim 14, wherein the something of value comprises something to which an ownership right was acquired by the sender in exchange for a payment.

24. The method as defined in claim 23, further comprising applying, by the one or more computers, the something of value or the deposit guarantee, if not taken, as a basis for sending or sending in a particular manner further Emails.

25. The method as defined in claim 24, further comprising applying the something of value, if not taken, at least in part as a deposit guarantee for the further Emails.

26. The method as defined in claim 24, further comprising applying, by the one or more computers, the something of value, if not taken, at least in part to the payment of fees for sending the further Emails.

27. An Email guarantee system, comprising:
one or more computers configured with the following components:
a component for receiving from a sender first information associated with the sending of at least one Email to at least one human recipient;
a component for determining whether something of value has been received from or on behalf of the sender or control of a deposit guarantee associated with something of value held or maintained on behalf of the sender, that is associated with the Email, has been established, at the same time as or prior to the sending of the Email to the recipient;
a component for, after receipt of the first information from the sender, electronically sending or sending in a particular manner, the Email to a recipient inbox for the human recipient depending at least in part on whether or not the system has determined that the something of value has been received from or on behalf of the sender or that control of the deposit guarantee associated with the something of value held or maintained on behalf of the sender, that is associated with the Email, has been established;
a component for evaluating second information generated after receipt of the Email by the recipient inbox, the second information consistent with a decision by the human recipient to approve or disapprove the Email, said decision having been made subsequent to the receipt of the Email by the recipient inbox; and
a component for facilitating taking or not taking the something of value or a benefit arising from the something of value based at least in part on the evaluating step only at a time subsequent to the receipt of the Email by the recipient inbox.

28. The system as defined in claim 27, wherein the component for facilitating is configured to facilitate a transfer electronically of at least part of the something of value or a second benefit arising from the something of value to a charity.

29. The system as defined in claim 27, further comprising:
a component configured in the one or more computers for adding a designation for the sender to a white list comprising a privileged class of senders whose Emails are sent in a preferred manner relative to those of other senders based at least in part on said designation, even when there has been no receipt of something of value or a deposit guarantee of something of value for these emails or when there has only been a receipt or a deposit guarantee of something of value that is of lower value compared to other senders, said component for adding configured to add the designation for the sender to the white list based at least in part on, or resulting at least in part from, an expression of approval made by the recipient in response to the Email, wherein the component for sending or sending in a particular manner is configured to use the white list to determine whether to send Emails or whether to send Emails in a preferred manner only with respect to the Emails addressed to the recipient.

30. The system as defined in claim 27,
a component configured in the one or more computers for adding a designation for the sender to a white list comprising a privileged class of senders whose Emails are sent in a preferred manner relative to those of other senders, even when there has been no receipt of something of value or a deposit guarantee of something of value for these emails or when there has only been a receipt or a deposit guarantee of something of value that is of lower value compared to other senders, said component for adding configured to add the designation for the sender to the white list based at least in part on, or resulting at least in part from, an expression of approval made by the recipient in response to the Email, wherein the component for sending or sending in a particular manner is configured to use the white list to determine whether to send Emails or whether to send Emails in a preferred manner to multiple recipients.

31. The system as defined in claim 27, wherein the something of value comprises a credit obtained in consideration for payment of a currency amount made by or on behalf of the sender, and wherein the taking results in an at least partial loss by or on behalf of the sender of the credit or of a right of refund to the currency amount.

32. The system as defined in claim 21, further comprising a component configured in the one or more computers for receiving third information consistent with a designation by the recipient that the sender should be designated as an allowed sender, and sending or sending in a particular manner Emails from the allowed sender based at least in part on said designation.

33. The system as defined in claim 27, wherein the component for determining is configured for determining that something of value has been received from or on behalf of the sender.

34. The system as defined in claim 33, wherein the something of value comprises a right to cause something to be forfeited, and wherein the component for facilitating or not facilitating is configured to initiate said forfeiture if a performance measure, that is based at least in part on the second information generated after receipt of the Email by the recipient inbox, indicates deficient performance on the part of the sender with respect to the Email.

35. The system as defined in claim 27, wherein the component for determining is configured for determining that control of a deposit guarantee associated with something of value held or maintained on behalf of the sender has been established, and wherein the component for facilitating taking of the something of value or benefit arising from the something of value comprises facilitating electronically cancelation of an ownership right of the sender.

36. The system as defined in claim 35, wherein the component for facilitating or not facilitating is configured to facilitate or not facilitate the taking or not taking a benefit arising from the something of value.

37. The system as defined in claim 35, wherein the component for facilitating or not facilitating is configured to facilitate or not facilitate the taking or not taking the something of value.

38. The system as defined in claim 35, further comprising a component configured in the one or more computers for sending electronically to the recipient a facility for starting an electronic process to indicate approval or disapproval of the Email, and wherein the component for evaluating is configured to evaluate based at least in part on the receiving or not receiving of second information regarding whether or not the recipient has initiated the electronic process.

39. The system as defined in claim 35, wherein the component for sending or sending in a particular manner is configured so that the sending in a particular manner is at least partly determinative of at least one of:
the email being placed in the recipient inbox, said recipient inbox being a priority-inbox;
the email being placed in the recipient inbox with an emphasis.

40. The system as defined in claims 27, 38, 31, 33, 35, 34, 37, 36, 28 or 39, further comprising:
a component configured in the one or more computers for adding a designation for the sender to a white list comprising a privileged class of senders whose Emails are sent in a preferred manner relative to those of other senders based at least in part on said designation, even when there has been no receipt of something of value or a deposit guarantee of something of value for these emails or when there has only been a receipt or a deposit guarantee of something of value that is of lower value compared to other senders, said component for adding configured to add the designation for the sender to the white list based at least in part on, or resulting at least in part from the second information having been indicative of the recipient having approved of the Email.

41. The system as defined in claim 40, further comprising:
a component configured in the one or more computers for receiving a payment from the sender, said payment made at least in part as consideration for the benefit received by the sender by sending the Email, and wherein said payment is at least in part non-reimbursable after the Email is sent, said partial or full non-reimbursability not depending on an indication of approval or disapproval of the human recipient.

42. The system as defined in claim 40, wherein the something of value is a currency amount or a credit obtained in consideration for payment of a currency amount made by or on behalf of the sender, and wherein the component for facilitating or not facilitating the taking is configured to at least initiate an at least partial loss by or on behalf of the sender of the credit and/or of a right of refund to the currency amount.

43. The system as defined in claim 40, wherein the something of value comprises something to which an ownership right was acquired by the sender in exchange for a payment.

44. The system as defined in claim 43, further comprising a component configured in the one or more computers for applying the something of value or the deposit guarantee, if not taken, as a basis for the component for sending or sending in a particular manner to send further Emails.

45. The system as defined in claim 44, wherein the component for applying the something of value to send further Emails is configured to apply the something of value, if not taken, at least in part as a deposit guarantee for the further Emails.

46. The system as defined in claim 44, wherein the component for applying the something of value to send further Emails is configured to apply the something of value, if not taken, at least in part to the payment of fees for sending the further Emails.

47. The system as defined in claim 40, further comprising:
a component configured in the one or more computers for receiving directly or indirectly from the sender fourth information associated with sending a new email to one or more destination recipient inboxes;
a component configured in the one or more computers for determining whether or not the sender is on the white list;
a component configured in the one or more computers for electronically sending or sending in a preferred manner, after receipt of the fourth information from the sender, the new email to the one or more destination Email inboxes depending at least in part on whether the sender has been determined to be on the white list.

48. The system as defined in claim 47, further comprising:
a component configured in the one or more computers for receiving at least one other-Email from at least one other sender to at least one other recipient, said at least one other Email from the at least one other sender not being backed by a receipt of something of value or a deposit guarantee of something of value;
a component configured in the one or more computers for determining whether the at least one other sender is on the white list;
a component configured in the one or more computers for blocking, the at least one other-Email from being relayed to a respective at least one other-recipient-priority-inbox of the at least one other recipient, at least in part based on the determination that the at least one other sender is not on the white list.

49. The system as defined in claim 48, wherein said component for determining whether the at least one other Email should or should not be sent is configured to determine whether the Email is associated with an IP address of a black-listed sender.

50. The system as defined in claim 48, further comprising:
a component configured in the one or more computers for facilitating referring the other sender to, or facilitating informing the other sender of, a program for obtaining mailing privileges for sending Emails via the system, said mailing privileges obtained at least in part by providing something of value or allowing for the establishment of a deposit guarantee of something of value.

51. The system as defined in claim 48, wherein the component for determining whether the at least one other Email should or should not be sent to the other-recipient-priority-inbox of the other recipient, is configured to make a determination based at least in part on a number of Emails received from that sender.

* * * * *